(12) United States Patent  (10) Patent No.: US 7,104,298 B2
Starinshak  (45) Date of Patent: Sep. 12, 2006

(54) TIRE HAVING ANTENNA ATTACHED TO ELASTIC FIBER TEXTILE STRIP AND METHOD OF MOUNTING ANTENNA ASSEMBLY TO TIRE

(75) Inventor: Thomas Walter Starinshak, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 208 days.

(21) Appl. No.: 10/745,306

(22) Filed: Dec. 22, 2003

(65) Prior Publication Data

US 2005/0133131 A1  Jun. 23, 2005

(51) Int. Cl.
  *B29D 30/00* (2006.01)
  *B60C 19/00* (2006.01)
  *H01Q 1/32* (2006.01)
  *H01Q 7/00* (2006.01)
(52) U.S. Cl. .................... 152/152.1; 156/110.1; 156/293; 340/445; 343/868; 343/897
(58) Field of Classification Search ........... 152/152.1; 156/110.1, 293; 343/868, 897; 340/445
  See application file for complete search history.

(56) References Cited

U.S. PATENT DOCUMENTS

| 3,662,335 | A | * | 5/1972 | Fritze ..................... 152/152.1 |
| 4,319,220 | A | * | 3/1982 | Pappas et al. ............ 340/447 |
| 4,754,285 | A | * | 6/1988 | Robitaille ................. 343/868 |
| 4,769,656 | A | * | 9/1988 | Dickey ..................... 343/718 |
| 5,541,574 | A | * | 7/1996 | Lowe et al. .............. 340/445 |
| 5,872,186 | A | * | 2/1999 | Ang ........................ 428/295.1 |
| 6,546,982 | B1 |   | 4/2003 | Brown et al. ............ 152/152.1 |
| 6,836,253 | B1 | * | 12/2004 | Strache et al. ............ 343/713 |
| 2002/0190853 | A1 | * | 12/2002 | Nigon et al. .............. 340/445 |
| 2003/0132893 | A1 | * | 7/2003 | Forster et al. ............ 343/895 |
| 2004/0016488 | A1 | * | 1/2004 | Benedict et al. ......... 152/152.1 |
| 2004/0189456 | A1 | * | 9/2004 | Myatt ....................... 340/445 |
| 2005/0132789 | A1 | * | 6/2005 | Starinshak .................. 73/146 |
| 2005/0132790 | A1 | * | 6/2005 | Starinshak .................. 73/146 |

FOREIGN PATENT DOCUMENTS

| EP | 657836 | * | 6/1995 |
| WO | 9929523 |   | 6/1999 |
| WO | 9929525 |   | 6/1999 |
| WO | WO 99/29522 | * | 6/1999 |
| WO | WO 99/29525 | * | 6/1999 |

* cited by examiner

*Primary Examiner*—Steven D. Maki
(74) *Attorney, Agent, or Firm*—Richard B. O'Planick

(57) ABSTRACT

An antenna system and method for tire monitoring systems provides an elasticized substrate in combination with an antenna wire(s). The antenna cable can be wrapped around or otherwise applied to the elasticized substrate, preferably in a wave or sinusoidal configuration. When subjected to forces of external origin, the substrate can elongate while the antenna wire straightens. Upon release from the influence of such forces, residual spring forces within the elasticized substrate relax and return the substrate and the antenna cable carried thereby back to its original, optimal configuration. The pitch of the antenna material on the substrate may be customized to suit the needs of the particular tire and communication. The antenna may be sewn or woven into the elasticized fabric, helically wound around a core composed of such material, or attached in an alternative manner.

6 Claims, 2 Drawing Sheets

TIRE HAVING ANTENNA ATTACHED TO ELASTIC FIBER TEXTILE STRIP AND METHOD OF MOUNTING ANTENNA ASSEMBLY TO TIRE

FIELD OF THE INVENTION

The invention relates generally to an apparatus, including an antenna and a transponder, for a tire pressure monitoring system and, more specifically, to an elastic annular apparatus for incorporation into a tire pressure monitoring system.

BACKGROUND OF THE INVENTION

It is common to employ annular apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

It is known in the art to employ an annular antenna to transmit, at radio frequencies, data from a transponder contained within the structure of a tire or tire and wheel assembly. The antenna comprises a wire or strands of wire formed into a loop that may be sheathed in an extruded covering formed from a suitable material such as plastic. The plastic sheath in combination with the antenna form a unitary body that may be affixed to a green tire in a pre-build assembly process or attached to a finished tire in a post-cure operation. While the antenna and transponder may be incorporated into a tire during "pre-cure" manufacture, in practice it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire.

Not only is the risk of damage to an annular antenna-transponder system present during its incorporation into a tire during manufacture, but damage to such systems are not uncommon from operation of the tire on a vehicle. Loop antennas and the electronics associated therewith are subjected to substantial compressive strain and at the sidewall a high strain amplitude. Such locations represent high load and deformation to regions of the tire. Consequently, antenna, transponders, and the connections therebetween in such locations are prone to breakage and mechanical or electrical failure.

There is, accordingly, a continuing need exists for an antenna apparatus suitable for incorporation into a tire either in a pre-cure or post-cure procedure. The antenna apparatus must provide sufficient structural integrity to withstand the stresses attendant tire building processes and post-manufacture use on a vehicle. Moreover, the antenna apparatus ideally will maintain its optimal, intended configuration and shape throughout the tire build operation and subsequent use on a vehicle. Since the performance of the tire pressure monitoring system is dependent upon efficient communication between the tire electronics and a remote reader via the antenna, maintaining the antenna in an optimal configuration is highly desirable.

SUMMARY OF THE INVENTION

The subject invention overcomes the deficiencies in known antenna systems and methods for tire monitoring systems by utilizing an elastic substrate in combination with an antenna wire(s). The antenna cable can be wrapped around or otherwise applied to the elastic substrate, preferably in a wave, helical or sinusoidal configuration. When subjected to forces of external origin, the substrate can elongate while the antenna wire straightens. Upon release from the influence of such forces, residual elastomeric spring forces within the elastic substrate returns the substrate and the antenna cable carried thereby back to its original, optimal configuration. The pitch of the antenna material on the substrate may be customized to suit the needs of the particular tire and communication system. In one aspect of the invention, the substrate comprises a tube of elastic material around which the antenna is wound. In another aspect of the invention the antenna may be formed to zigzag across an elastic substrate in strip form. In another aspect of the invention the antenna may be attached to the substrate by a sewing procedure or by adhesive application to the substrate. Such an assembly may be incorporated into a tire during the tire manufacturing process or attached to the tire by adhesives or other known methods in a post-manufacture attachment procedure. The elastic substrate protects the integrity of the antenna wire; allows the unitary assembly to be conveniently transported and inventoried; restores the antenna back into an intended optimal configuration after allowing for a dissipation of mechanical energy through elongation of the antenna and substrate; and maintains an optimal location of the antenna annular assembly within a tire cavity.

According to a further aspect of the invention, a method is provided for associating a loop antenna with a tire comprising the steps: assembling an antenna to an elastic substrate operably elongating when subjected to external forces and contracting when such forces dissipate; and attaching the antenna and substrate assembly into a pneumatic tire.

The advantages of the invention, which will be apparent to those skilled in the art, are achieved by preferred and alternative embodiments that are described in detail below and illustrated by the accompanying drawings.

DETAILED DESCRIPTION OF THE INVENTION

A tire pressure monitoring system typically consists of a transponder having one or more sensors. The transponder and associated electronics are housed within a package. In order to send or receive RF signals, a transponder must have an antenna. The antenna is preferably annular in configuration in the subject invention but may have alternative shapes if desired. The antenna may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The preferred location is the sidewall, but upper sidewall or crown placement is also possible. The antenna may comprise a single wire or a plurality of strands. Various commercially available transponders, sensors, and other electrical devices deployed in combination with an annular antenna formed from conventional conductive materials are suitable for use in conformance with the principles of the subject invention Acceptable materials for the antenna wire include steel, aluminum, copper, copper alloys or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, ribbon conductors over organic fibers, flexible circuits, conductive film, conductive rubber, etc.

Figure 1:
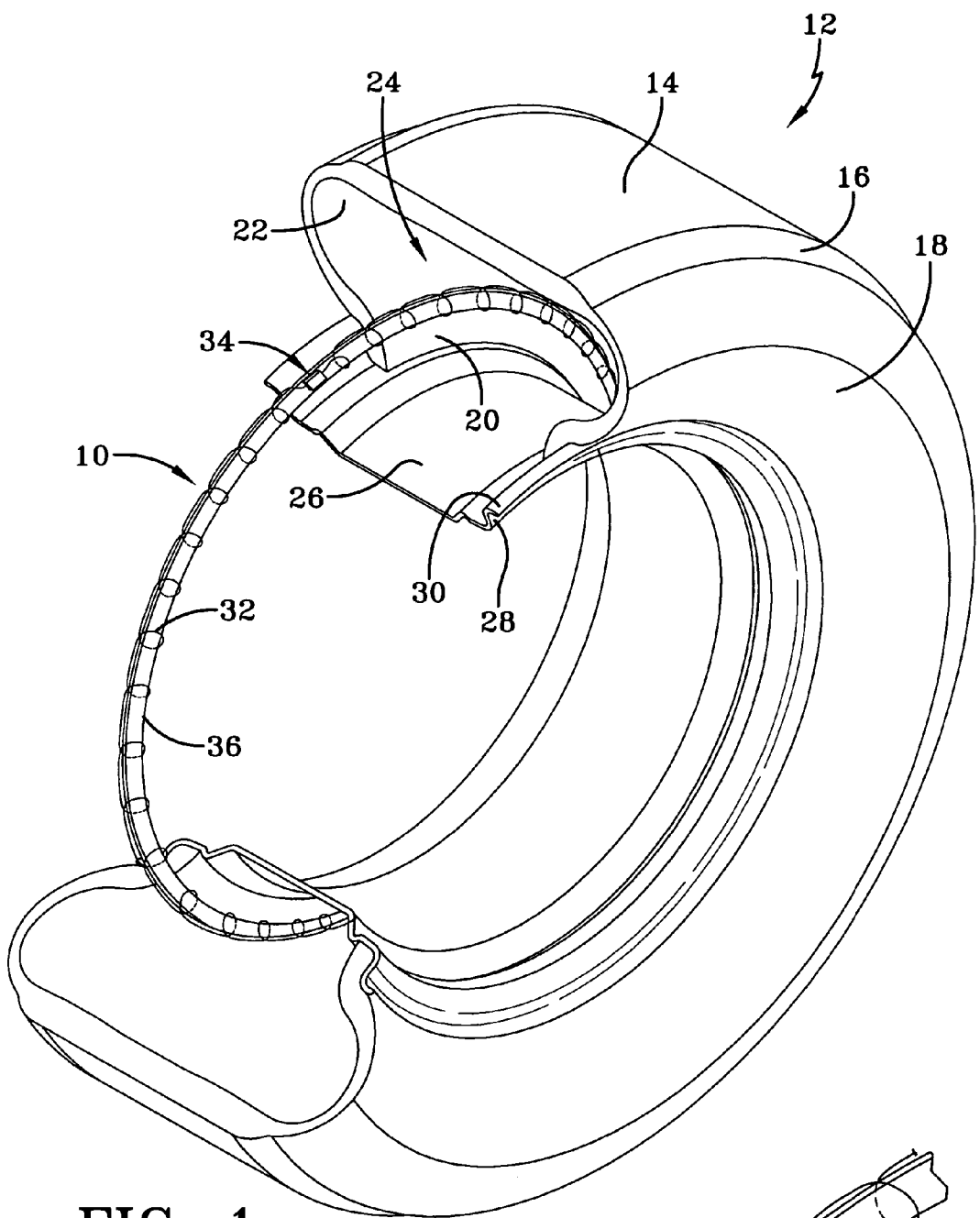
FIG. 1 is a perspective view of a tire and the subject annular apparatus with portions of the tire removed for the purpose of illustration.

Referring initially to FIG. 1, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper, copper alloys or other electrically conducting wire. As mentioned previously, the wire diameter is not generally considered critical for operation as an antenna and multiple strands of fine wire is preferred. The sinusoidal, or zigzag form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Included as part of the apparatus 10 is a carrier strip of material 36 formed preferably but not necessarily into the annular configuration shown. Carrier strip 36 is formed of electrically insulating, elastic material as will be described below. In the post manufacturing state, therefore, the apparatus 10 comprising antenna 32, transponder module 34, and carrier strip 36, in a unitary, generally circular, assembly that is readily transportable and handled for attachment to tire 12. The diameter of the apparatus assembly 10 is a function of the size of the tire 12 and the preferred attachment location thereon.

Figure 2:
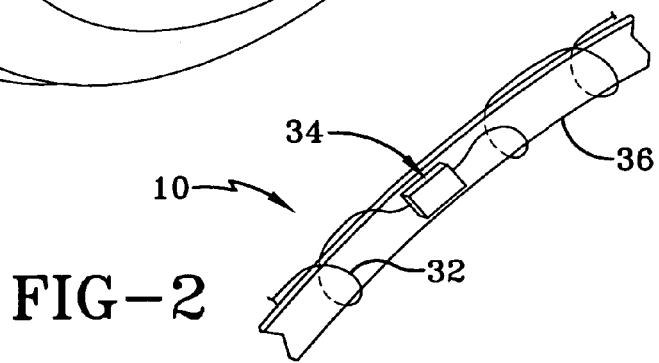
FIG. 2 is an enlarged schematic view of a portion of an antenna apparatus pursuant to the invention.

In combined reference to FIGS. 1 and 2, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture.

Figure 3:
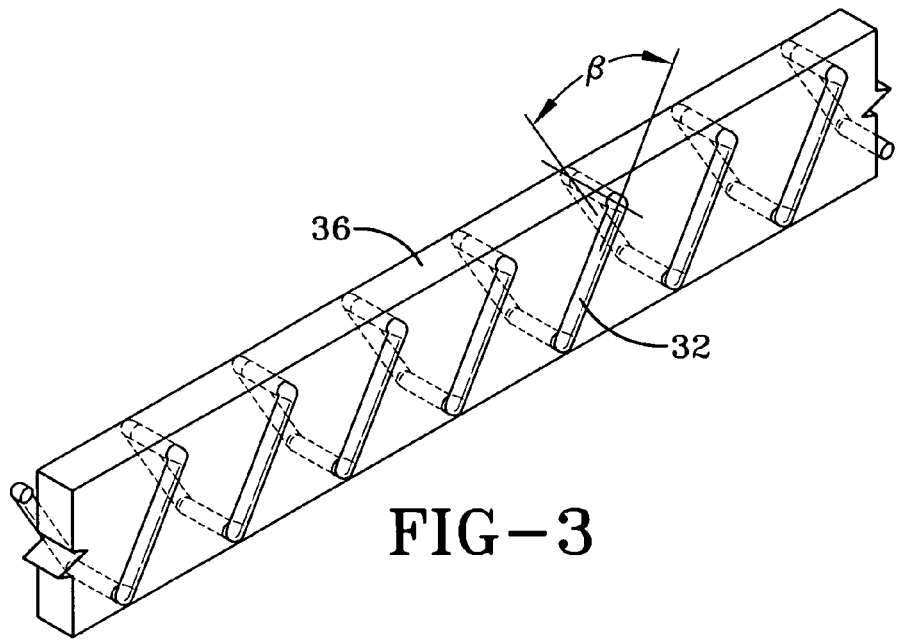
FIG. 3 is a perspective view of an antenna segment.

With reference to FIG. 3, pursuant to the invention, the carrier strip 36 represents an elastic substrate on which the antenna 32 is secured in one of a variety of attachment methods. The carrier strip 36 utilizes elasticized fibers, generically referred to herein as Spandex in the shape of a tube, strip, or other alternative geometries that will be obvious to those skilled in the art. The antenna cable 32 may be either a single wire or a strand of plural wires wrapped around carrier strip 36 in the form of a tube, or, alternatively zigzagged across the strip 36.The antenna 32 may, by way of example and without any intent to delimit the invention, be sewn into the elastic material or woven into the material. The antenna 32 is held by the carrier strip material in a preferred configuration that will optimize the communication performance of the antenna in the system.

When situated in a tire and subjected to stresses present within the tire, the carrier strip 36 so composed will elongate from an initial relaxed state into an extended state. The wavy, sinusoidal, or zigzag shape of the antenna 32 will straighten to accommodate the elongation. When released from the influence of tire stress, the elastic fiber construction will recover and contract to the original, optimal, carrier strip shape. The pitch on the antenna zigzag, $\theta$, shown in FIG. 3, may be preselected based upon the angle necessary to accommodate predicted elongation.

Figure 4:
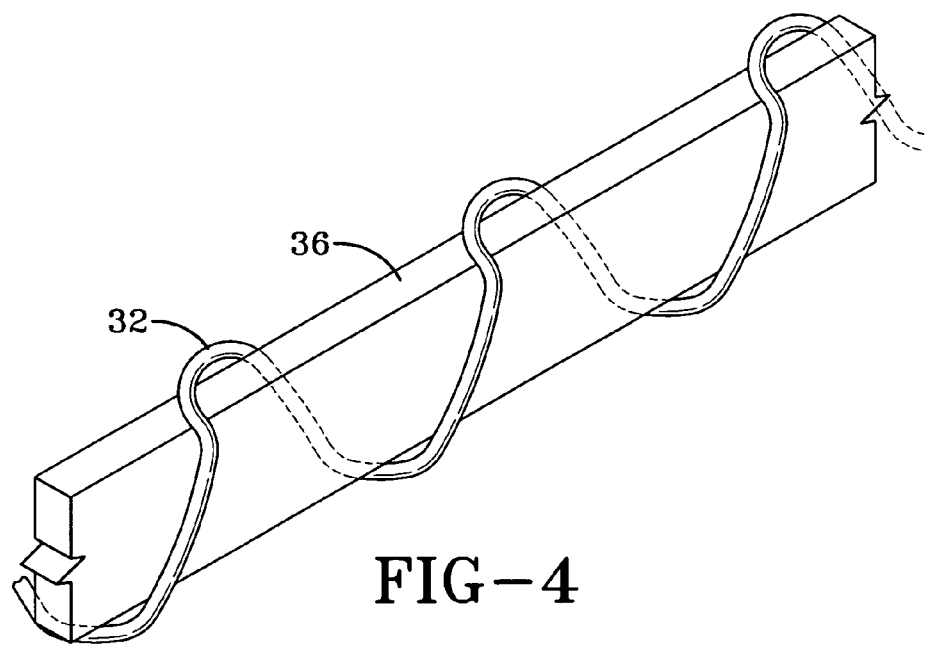
FIG. 4 is a perspective view of an alternative embodiment of an antenna configured to spirally wrap around a substrate core.

FIG. 4 shows the antenna 32 in an alternate embodiment in which the antenna is a helical wrap surrounding an elastic Spandex core 36. The helical wrap allows for an elongation of antenna 32 in conjunction with core 36 in the manner described above. The wrap on the elastic tube, with preferred dimensions between 1–1.5 mm in diameter, can be a single cable/filament, multiple individual parallel filament wraps, a braided structure, or filaments cabled upon the core to lie in the same direction. In regard to the carrier strip 36, the width of the strip may be selected to provide the requisite elastic performance. By way of example without any intention to delimit the invention, ¼ inch to ½ inch wide spandex material having a thickness of 1 mm may be used. Antenna 32 may be sewn to the substrate 36 by the use of a conventional needle to form the desired finished antenna apparatus. Moreover, if needed, an adhesive of the type commercially available may be applied to the substrate 36 to retain the antenna wire(s) in place.

From the foregoing, it will be appreciated that the subject invention satisfies the need of the industry for a convenient, reliable method of affixing an antenna in annular form to the inside of a tire. Use of an elasticized textile as a substrate for holding the antenna in an optimal configuration when in a relaxed state is economical and highly effective. The substrate extends from an initial relaxed state when the stresses within a tire are imposed; the material of the substrate and the curvilinear configuration of the antenna accommodating such an elongation. The recovery of the substrate to its original form is predictable, and durable enough to withstand the necessary number of elongation/recovery cycles within a typical tire used in an intended manner. LYCRA SPANDEX (registered trademark of E.I. DuPont de Nemours & Company), for example, is one material that may be employed. Other commercially available stretch fabrics may also be utilized. Such fabrics are available having a selection of stretch resistance, stress decay, hysteresis, residual stretch, and recovery characteristics. Materials will generally have a cycle limit, representing the greatest elongation to which the material may be subjected without resulting in a permanent deformation. The holding power and stretch resistance may further be selected to provide an optimum match between the elasticized characteristics of the substrate 36 and the magnitude of elongation required due to stresses from use within a tire environment.

The advantages of the subject invention over antenna apparatus composed of a rubber carrier strip are significant. Spandex fiber construction can be stretched repeatedly and still recover to very near original length and strength; the material may be stretched through a high number of cycles without breaking; the material is stronger, more durable and exhibits a higher retractive force than rubber. Moreover, elasticized fabric is lightweight, supple and may be formed into a wide variety of shapes.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. A tire having an antenna assembly incorporated therein, the tire comprising:
   a tire body having an inward facing wall;
   an elongate antenna;
   an elongate carrier strip formed of non-conductive elastic material attached to the antenna to maintain the antenna in a preferred configuration, the carrier strip attaching to the inward wall of the tire and extending from an initial relaxed state to an extended state when subjected to stresses within the tire and substantially recovering from the extended state in the absence of said stresses;
   wherein the carrier strip is composed substantially from an elastic fiber material and the carrier strip comprises at least one textile fabric strip woven from the elastic fiber material; and
   wherein the antenna is at least partially sewn to the one textile fabric strip.

2. A tire-having an antenna assembly incorporated therein, the tire comprising:
   a tire body having an inward facing wall;
   an elongate antenna;
   an elongate carrier strip formed of non-conductive elastic material attached to the antenna to maintain the antenna in a preferred configuration, the carrier strip attaching to the inward wall of the tire and extending from an initial relaxed state to an extended state when subjected to stresses within the tire and substantially recovering from the extended state in the absence of said stresses;
   wherein the carrier strip is composed substantially from an elastic fiber material and the carrier strip comprises at least one textile fabric strip woven from the elastic fiber material; and
   wherein the antenna is at least partially woven through the textile fabric strip.

3. A tire having an antenna assembly incorporated therein, the tire comprising:
   a tire body having an inward facing wall;
   an elongate antenna;
   an elongate carrier strip formed of non-conductive elastic material attached to the antenna to maintain the antenna in a preferred configuration, the carrier strip attaching to the inward wall of the tire and extending from an initial relaxed state to an extended state when subjected to stresses within the tire and substantially recovering from the extended state in the absence of said stresses;
   wherein the carrier strip is composed substantially from an elastic fiber material and the carrier strip comprises at least one textile fabric strip woven from the elastic fiber material; and
   wherein the antenna is configured in a zigzag pattern extending at a pre-selected pitch across the textile fabric strip.

4. A method of mounting an annular antenna and transponder to a tire, comprising the steps:
   providing an elongate antenna;
   forming an elongate carrier strip from least one textile fabric strip woven from an elastic fiber material;
   attaching the antenna to the elongate carrier strip, the carrier strip being formed of the elastic fiber material to extend from an initial relaxed state to an extended state when subjected to stresses within the tire and substantially recover from the extended state in the absence of said stresses to maintain the antenna in a preferred configuration;
   at least partially sewing the antenna to the one textile fabric strip; and
   attaching the carrier strip to an inward wall of a tire.

5. A method according to claim 4 comprising the further step of configuring the antenna in a zigzag pattern extending at a pre-selected pitch across the textile fabric.

6. A method of mounting an annular antenna and transponder to a tire, comprising the steps:
   providing an elongate antenna;
   forming an elongate carrier strip from least one textile fabric strip woven from an elastic fiber material;
   attaching the antenna to the elongate carrier strip, the carrier strip being formed of elastic fiber material that extends from an initial relaxed state to an extended state when subjected to stresses within the tire and substantially recover from the extended state in the absence of said stresses to maintain the antenna in a preferred configuration;
   at least partially weaving at least a portion of the antenna into the one textile fabric strip; and
   attaching the carrier strip to an inward wall of a tire.

* * * * *